United States Patent [19]
Putrino et al.

[11] Patent Number: 5,754,811
[45] Date of Patent: May 19, 1998

[54] INSTRUCTION DISPATCH QUEUE FOR IMPROVED INSTRUCTION CACHE TO QUEUE TIMING

[76] Inventors: Michael Putrino, 8411 Ephraim Rd., Austin, Tex. 78717; Soummya Mallick, 13032 Partridge Bend Dr., Austin, Tex. 78729; Albert John Loper, 1003 Forest Trail, Cedar Park, Tex. 78613

[21] Appl. No.: 730,606

[22] Filed: Oct. 8, 1996

[51] Int. Cl.⁶ .................................................. G06F 9/00
[52] U.S. Cl. .................................................. 595/390
[58] Field of Search .............................. 395/390, 376, 395/381, 392

[56] References Cited

U.S. PATENT DOCUMENTS

5,509,130  4/1996  Trauben et al. ...................... 395/382
5,581,718  12/1996  Grochowski .......................... 395/382
5,655,097  8/1997  Witt et al. ............................ 395/380

*Primary Examiner*—David Y. Eng
*Attorney, Agent, or Firm*—Michael A. Davis, Jr.

[57] ABSTRACT

A circular dispatch queue is used to implement an instruction queue, in a microprocessor, in order to reduce the delay associated with the critical timing path between an instruction cache memory and the instruction queue. In the circular dispatch queue, instructions are never moved from one stage to another. Instead, pointers are maintained that indicate the top and bottom instructions within the circular dispatch queue. This technique removes inputs from the multiplexor between the register stages in the circular dispatch queue and the instruction cache memory, thus reducing the critical delay.

18 Claims, 5 Drawing Sheets

INSTRUCTION DISPATCH QUEUE FOR IMPROVED INSTRUCTION CACHE TO QUEUE TIMING

FIELD OF THE INVENTION

The invention disclosed broadly relates to computer systems and methods, and specifically to microprocessors.

BACKGROUND OF THE INVENTION

It is a goal of microprocessor design to execute as many instructions per unit time as possible. This goal is furthered by increasing the microprocessor clock frequency, which in turn requires reducing the time delay associated with critical timing paths in the logic of the microprocessor.

Microprocessors generally receive instructions and store them in an instruction cache memory, residing on the microprocessor chip. These instructions are then fetched, pre-decoded, and held in an instruction queue for later dispatch to targeted execution units. Traditionally, the instruction queue is similar to a first-in/first-out (FIFO) buffer, with the exception that the top of queue position, where the instructions are input to the queue, varies depending on how full the queue is.

Every time an instruction, or group of instructions, is dispatched from the bottom of the instruction queue, all remaining instructions must be moved down in order to fill the spots left vacant by the dispatched instruction(s). Therefore, a multiplexor exists in front of each register stage in the instruction queue to select data either from the instruction cache, from the instruction queue stage directly above it, or from one of multiple instruction queue stages above it, depending on the number of instructions the microprocessor can dispatch per processor clock cycle. For example, a microprocessor capable of simultaneously dispatching four instructions, would require multiplexors with at least six inputs. Four inputs would be used to receive data from each of the four previous stages. In a dual instruction fetch processor, two more inputs would be used to select one of two instructions fetched. Furthermore, time delay across this multiplexor is proportional to the number of its inputs. Therefore, reducing the number of inputs to the multiplexor will reduce the time delay across it.

The multiplexor in the instruction queue is located in a critical timing path, lying between an instruction cache memory and a register of the instruction queue. Instructions from the instruction cache must be fetched and stored in an instruction queue register, within one clock cycle. For a 100 mega-hertz microprocessor, that operation must occur within 10 nanoseconds. Therefore, reducing the number of inputs to the multiplexor will allow the clock frequency of the microprocessor to be increased.

SUMMARY OF THE INVENTION

The present invention reduces the delay associated with the critical timing path between the instruction cache memory and the instruction queue, by reducing the required number of inputs to the multiplexor. Instead of a FIFO queue, the invention uses a circular dispatch queue in which instructions are never moved from one stage to another. Pointers are maintained that indicate the top and bottom instructions within the circular dispatch queue.

This technique removes four inputs from the multiplexor in front of the register stages in the instruction queue, for a microprocessor capable of simultaneously dispatching four instructions. Thus, the delay across the multiplexor, located in the critical timing path, is reduced allowing a higher microprocessor clock frequency. The cost of the invention is the added multiplexors at the output of the circular dispatch queue, which are not in a critical timing path.

Implementing the circular dispatch queue requires a plurality of n stages of instruction registers for storing instructions. Each stage is coupled to an instruction multiplexor, for selecting and supplying instructions to the n stages of instruction registers. The instructions are selected from an instruction source, via a sequential fetcher.

A bottom of dispatch queue pointer (BD pointer) and a top of dispatch queue pointer (TD pointer) are maintained. Each is capable of storing n different values. The value in the TD pointer indicates a top stage in the n stages of instruction registers. The value in the BD pointer indicates a bottom stage within the n stages of instruction registers.

Storage sequence logic is coupled to the TD pointer. This logic is used to control the instruction multiplexors so that a new instruction, fetched by the sequential fetcher, will be selected by and stored in the top stage within the circular dispatch queue. The storage sequence logic will then cause the remaining n−1 stages of instruction registers to retain stored instructions.

Fetch control logic is coupled to the BD and TD pointers and is used to change the value in the TD pointer. The value in the TD pointer is changed in response to a new instruction being stored in the top stage of the circular dispatch queue, until the value in the TD pointer is equal to a first predetermined value. After this occurs, the value in the TD pointer is reset to a second predetermined value. Additionally, the fetch control logic sends flag signals to the sequential fetcher, indicating the status of the circular dispatch queue.

Dispatch sequence logic, coupled to the BD pointer, is used to control a plurality of m dispatch multiplexors, which are each connected to the output of all n stages of instruction registers. The dispatch sequence logic acts to output m instructions beginning from the bottom stages of the circular dispatch queue as determined by the value in the BD pointer.

Dispatch control logic is coupled to the outputs of the BD and TD pointers, and is used to determine the maximum number of instructions available for simultaneous dispatch from the outputs of the dispatch multiplexors. The maximum number is less than m+1 and is determined based on the values in the BD and TD pointers. After instructions are dispatched, the dispatch control logic changes the value in the BD pointer based on the number of instructions actually dispatched, until the value in the BD pointer would exceed the first predetermined value. After which the value in the BD pointer is reset to the second predetermined value.

A dispatch router is coupled to the dispatch control logic and is used to dispatch instructions, up to the maximum defined above, from the outputs of the dispatch multiplexors.

DESCRIPTION OF THE FIGURES

These and other objects, features, and advantages will be more fully appreciated with reference to the accompanying drawings.

DETAILED DESCRIPTION OF THE PREFERRED EMBODIMENTS

Figure 1:
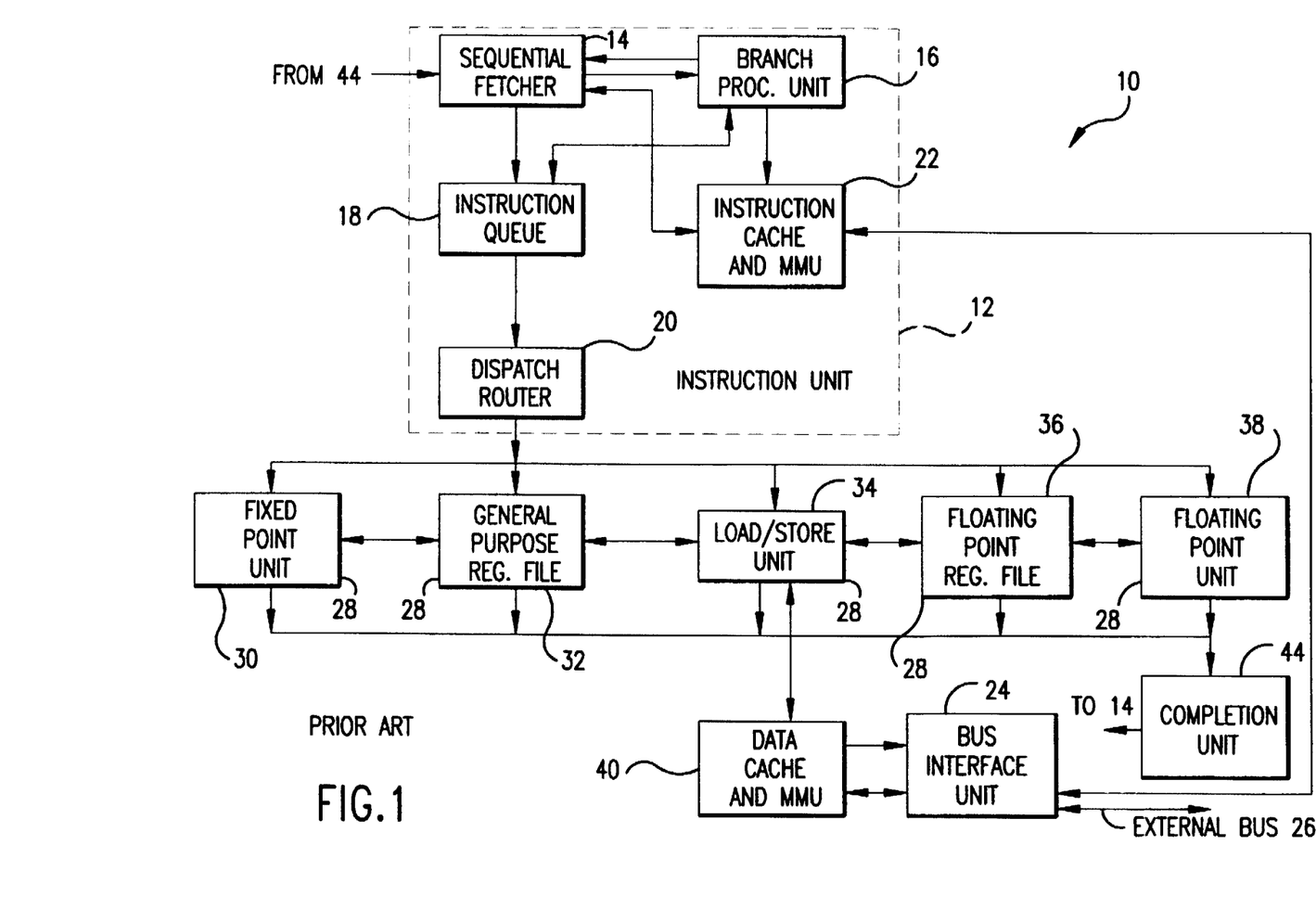
FIG. 1 is a functional block diagram of a multiple execution unit parallel microprocessor within which the disclosure finds application.

FIG. 1 shows an overall functional block diagram of a multiple execution unit, superscaler microprocessor 10, within which the disclosure finds application. Examples of microprocessors having the features depicted are described in the "PowerPC 603 RISC Microprocessor User's Manual", published by IBM Microelectronics and Motorola, publication number MPC603UM/AD, copyright 1994, and the "PowerPC 604 RISC Microprocessor User's Manual", also published by IBM Microelectronics and Motorola, publication number MPC604UM/AD, copyright 1994.

The microprocessor in FIG. 1 includes an instruction unit portion 12, including a sequential fetcher 14, a branch processing unit 16, an instruction queue 18, a dispatch router 20, and an instruction cache and memory management unit (MMU) 22. The instruction cache and MMU 22 is connected to a bus interface unit 24 which in turn is connected to the external bus 26. The instruction unit portion 12 provides centralized control of instruction flow to the execution units 28.

The execution units 28 include a fixed point unit 30, a general purpose register file 32, a load/store unit 34, a floating point register file 36 and a floating point unit 38.

A data cache and memory management unit (MMU) 40 is connected to the load/store unit 38, and is also connected to the bus interface unit 24.

The sequential fetcher 14 fetches the instructions from the instruction cache and MMU 12 and places them into the instruction queue 18. The branch processing unit 16 extracts branch instructions from the sequential fetcher 14 and uses static branch prediction on unresolved conditional branches to allow the fetching of instructions from a predicted target instruction stream while a conditional branch is being evaluated. In alternative embodiments, the branch processing unit 16 extracts branch instructions from the instruction queue 18. Instructions to be executed by the floating point unit 38, the fixed point unit 30, and the load/store unit 34 are dispatched by the dispatch router 20.

The instruction queue 18 holds instructions. The sequential fetcher 14 continuously loads as many instructions as space allows into the instruction queue 18. Instructions are dispatched to their respective execution unit 28 over instruction dispatch buses 42 from the dispatch router 20. Dispatch at a is maximum rate of two or four instructions per cycle is typical. The dispatch router 20 performs source and destination register dependency checking, determines dispatch serializations, and inhibits instruction dispatching as required.

The fixed point unit 30 executes all integer instructions. The load/store unit 34 executes all load/store instructions and provides the data transfer interface between the General Purpose Registers 32, the Floating Point Registers 36, and the cache/memory subsystems. The floating point unit 38 executes all floating point instructions. In alternative embodiments, there may be several, separate execution units 28 in parallel for executing integer or floating point instructions.

The completion unit 44 tracks instructions from their dispatch by the dispatch router 20 through execution by the respective execution unit 28, such as the fixed point unit 30. The completion unit then retires or completes the instruction in program order.

Figure 2:
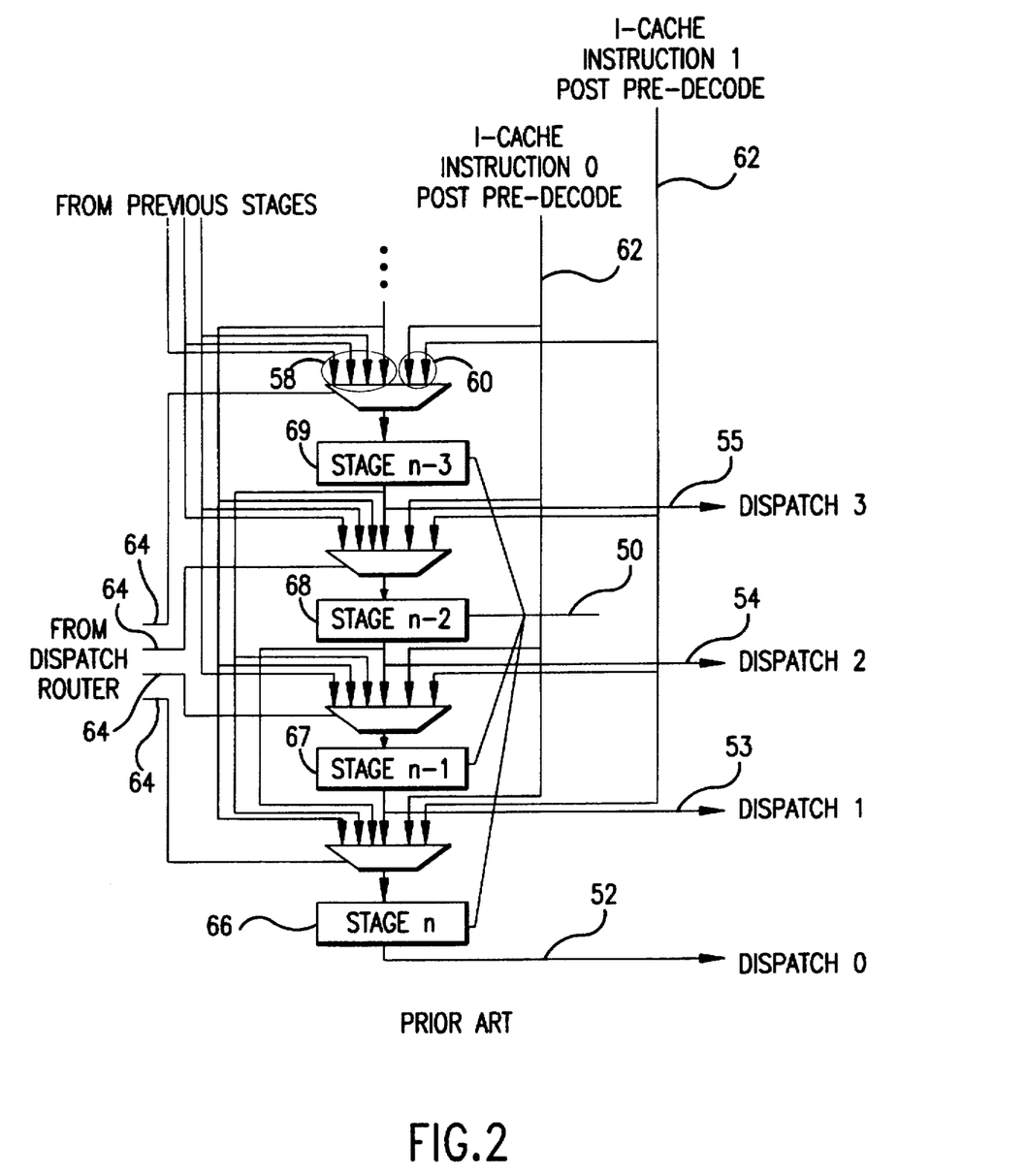
FIG. 2 is a depiction of an instruction queue used in the prior art.

FIG. 2 is a more detailed illustration of the contents of the instruction queue 18 as implemented in the prior art. The bottom four stages of an n stage instruction register 50 is depicted. The instructions output from each of these stages is coupled over lines 52, 53, 54, 55 to the dispatch router for later dispatch to an execution unit for processing. Line 52 contains the first instruction in the queue, line 53 the next, and lines 54 and 55 contain the subsequent two instructions. The inputs of each of the n stages of instruction registers 50 is connected to a preceding multiplexor 56. The multiplexor 56 has four inputs 58 allocated to the outputs of the register stages immediately preceding. In addition, the multiplexor has allocated two inputs 60 to receive instructions from the instruction sequential fetcher 14. The number of inputs, however, will vary depending on the instruction fetch capability of the microprocessor. A microprocessor capable of fetching four instructions would have four inputs into the multiplexor 56 to receive instructions from the instruction sequential fetcher 14. The instruction sequential fetcher 14 receives instructions from the instruction cache and MMU 22, decodes the instructions, and sends them over line 62 to the multiplexor inputs 60 for storage to the instruction registers 50 within one processor clock cycle.

Select lines 64 are connected between the dispatch router 20 and the multiplexors 56. These select lines 64 control which data the instruction multiplexor 56 will route from its inputs to the corresponding register stage 50. For example, in FIG. 2, if the dispatch router dispatched two instructions in an immediately preceding cycle, on the following cycle, the select line 64 would cause instructions stored in stage (n−2) 68 and stage(n−3) 69 to advance to stage(n) 66 and stage(n−1) 67 in the instruction queue 18, respectively. Assuming that stage(n−2) 68 is the top of the instruction queue, select lines 64 would cause a first new instruction to enter stage(n−2) 68 and a second new instruction to enter stage(n−3) 69. In this manner, new instructions sequentially enter the instruction queue 18 at the top and advance down the queue until the instructions leave the instruction queue 18 having been sequentially dispatched from the bottom.

Figure 3:
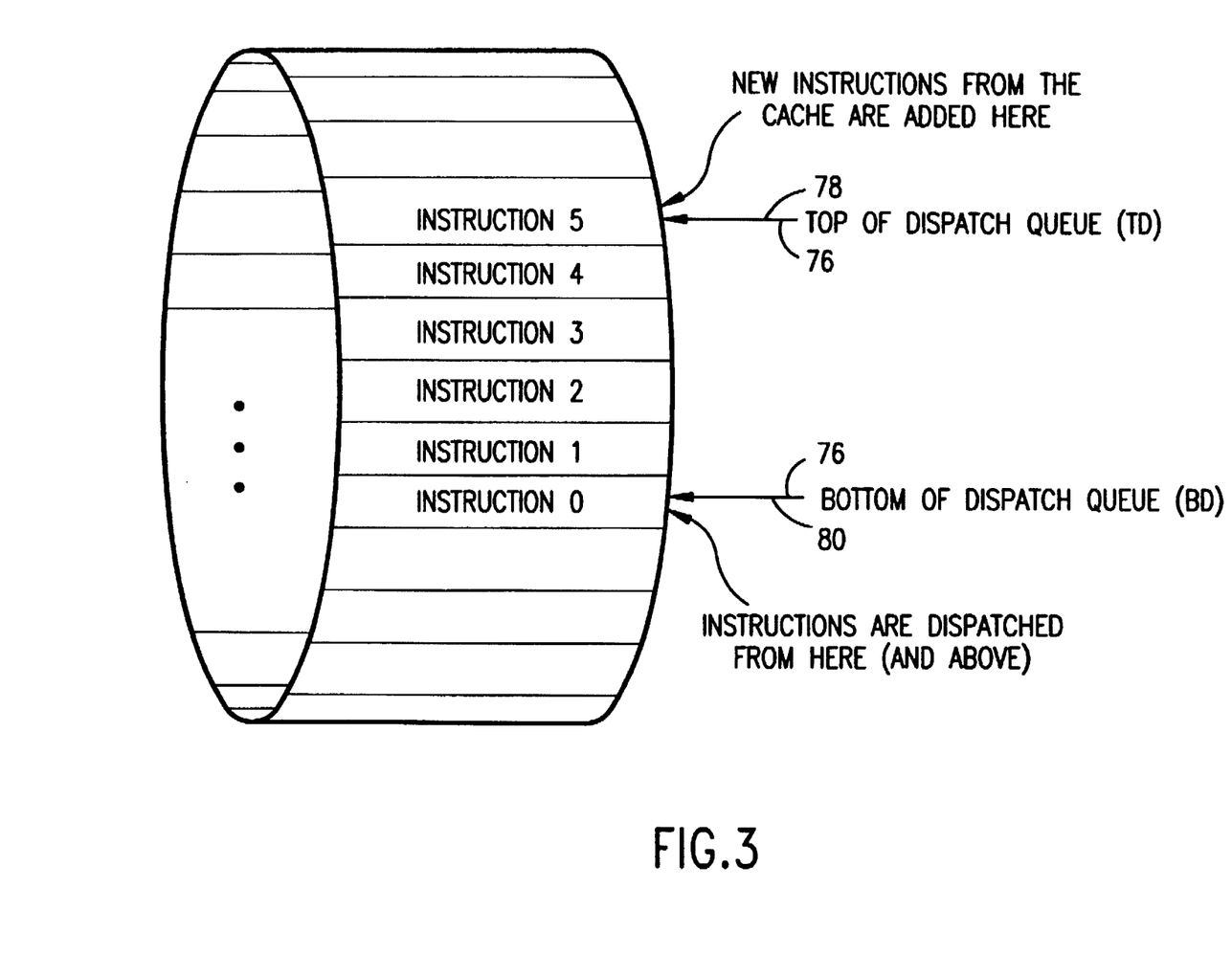
FIG. 3 is a conceptual illustration of the circular dispatch queue of the present disclosure.

FIG. 3 shows a conceptual illustration of a circular dispatch queue 74 which improves upon the instruction queue 18 of the prior art. In the prior art, the stack of n stages of instruction registers 50 has a fixed top and bottom, and instructions pass from register stage to register stage, from the top to the bottom. In the present disclosure, instructions do not pass from register stage to register stage within the circular dispatch queue 74. Rather, pointers 76 are maintained which indicate the position of the top and bottom of the queue within the circular dispatch queue 74. When the queue is empty, the top of dispatch queue pointer (TD pointer) 78 points to the same location as the bottom of dispatch pointer (BD Pointer) 80. When the circular dispatch queue is full 74, the TD pointer 78 indicates a location n stages above the BD pointer. When the pointers 76 reach location n−1, the next increment is to location 0, thus creating the circle.

When new instructions enter the circular dispatch queue 74, they are stored in locations beginning with the location specified by the TD pointer 78. The TD pointer 78 is incremented after sequentially storing each instruction, or group of instructions, so that new instructions continue to be stored above the previous instructions stored in the circular dispatch queue 74. The circular dispatch queue 74 is full when the value in the BD pointer 80, subtracted from the value in the TD pointer 78 is equal to the number of stages, n, in the circular dispatch queue 74. At this point, no new instructions will be fetched by the sequential fetcher 14 into the circular dispatch queue 74 until instructions are dispatched, beginning sequentially from stage of the n stages of instruction registers 88. This will allow increasing the microprocessor 10 clock frequency, and is the chief advantage of the circular dispatch queue 74.

Figure 4:
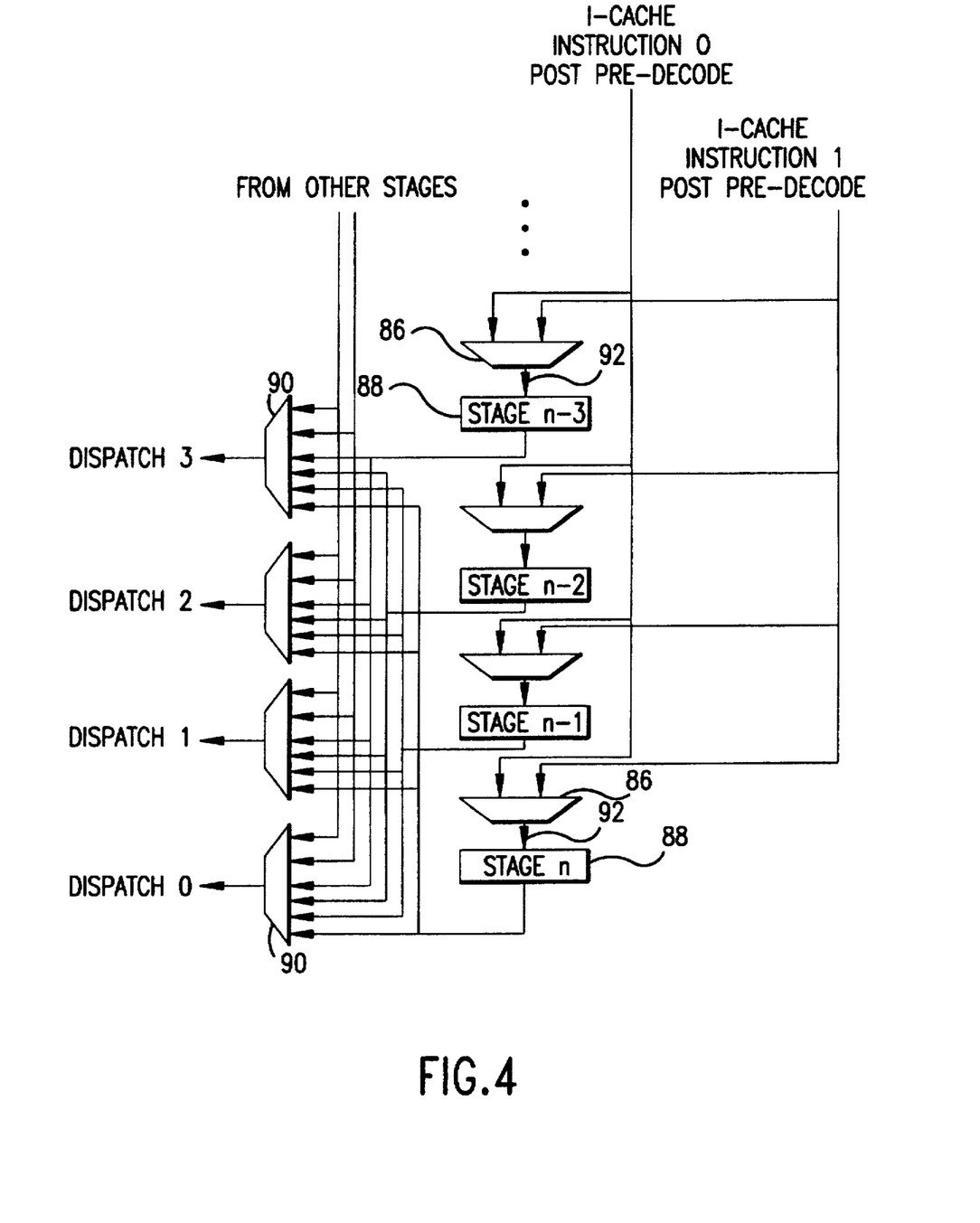
FIG. 4 is a depiction of a portion of the logic used to implement the present invention, which highlights fewer inputs to the multiplexor preceding each register stage in the circular dispatch queue.

A cost of the circular dispatch queue 74 is also apparent in FIG. 4. Dispatch multiplexors 90, coupled to the output of all n stages of instruction registers 88, are required. These multiplexors 90 add delay to the logic path between the n stages of instruction registers 88 in the circular dispatch queue 74 and the logic that they are coupled to. However, this logic is not typically located in a critical timing path, and hence added delay does not necessitate a lowering of the microprocessor 10 clock frequency.

Figure 5:
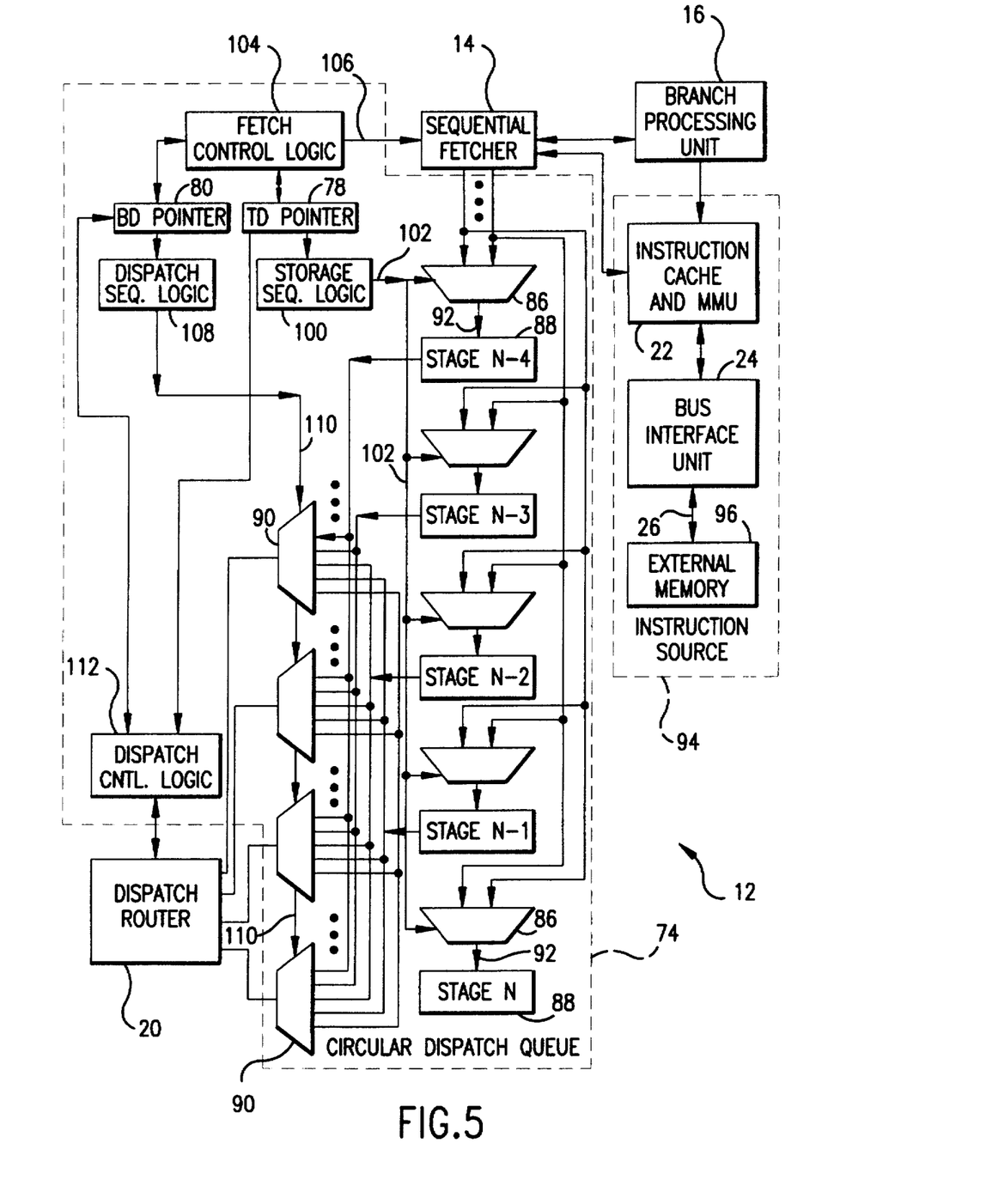
FIG. 5 is an exploded view of the circular dispatch queue, in place of the instruction queue of the prior art, in an instruction unit portion of a microprocessor.

FIG. 5 depicts an exploded view of the circular dispatch queue 74, in place of the instruction queue 18 of the prior art, in an instruction unit portion 12 of a microprocessor 10. The circular dispatch queue 74 uses a plurality of n stages of instruction registers 88 for storing instructions. Each stage of the n stages of instruction registers 88 is connected at its inputs over line 92 to the outputs of n instruction multiplexors 86. These n instruction multiplexors 86 select and supply instructions at their inputs to the n stages of instruction registers 88 for storage. The n instruction multiplexors are each coupled at their inputs to an instruction sequential fetcher 14, the location or locations specified by the value stored in the BD pointer 80. After dispatching an instruction or group of instructions, the value stored in the BD pointer 80 is incremented accordingly.

FIG. 4 depicts an isolated view of the multiplexor and register scheme of the circular dispatch queue 74. It will be noted that the instruction multiplexors 86 preceding each stage of the n stages of instruction registers 88 have fewer inputs than disclosed in the prior art, as depicted in FIG. 2. This is possible because there is no requirement for register stage to register stage transfer of instructions in the circular dispatch queue 74.

It is a goal of microprocessor design to execute as many instructions per unit time as possible. This goal is furthered by increasing the microprocessor clock frequency, which in turn requires reducing the time delay associated with critical timing paths in the logic of the microprocessor. The instruction multiplexor 86 preceding each of the n stages of instruction registers 88 in the circular dispatch queue 74 is in a critical timing path, located between the n stages of instruction registers 88 and the instruction cache and MMU 22. Moreover, delay across a multiplexor is proportional to the number of its inputs. Therefore, removing inputs from the multiplexor 56, with the implementation shown in FIG. 4, lowers the delay in the critical path between the instruction cache and MMU 22 and each The instruction sequential fetcher 14 fetches instructions from an instruction source 94 in the order specified by the computer program being executed by the microprocessor 10. If the next sequential instruction is currently stored within the instruction cache and MMU 22, and is available when requested by the sequential fetcher 14, a cache-hit will have occurred. The instruction will then be supplied by the instruction cache and MMU 22 to the sequential fetcher 14 which will in turn make the new instruction or instructions available to the top stage or stages of the n stages of instruction registers 88 within one processor cycle.

If a cache-hit does not occur, the instruction cache and MMU 22 will request a block of instructions from external memory 96 be loaded into the instruction cache and MMU 22 on chip for execution. The external memory 96, or the instruction source 94 itself, may be implemented with any form of memory means for storing data including with discrete logic elements, Static Random Access Memory (SRAM), Dynamic Random Access Memory (DRAM), Application Specific Integrated Circuits (ASICs), hard-disk drives, cd-rom disk drives, magnetic-tape drives, or any combination thereof. Once the block of instructions have been loaded into the instruction cache and MMU 22, the sequential fetcher 14 will retrieve the next instruction, when available, as a cache-hit.

A branch processing unit 16 is typically included in an advanced superscaler microprocessor 10 in order to predict branches in the sequence of instructions. The branch processing unit 16 will typically extract branch instructions that are decoded in the instruction sequential fetcher 14. The branch processing unit 16 will then perform static branch prediction on unresolved conditional branches in instruction sequence to allow the fetching of instructions, from a predicted target instruction stream, while a conditional branch is being evaluated.

Pointers 76 are maintained by registers 88 within the circular dispatch queue to indicate positions within the n stages of instruction registers 88 in the circular dispatch queue. The pointers 76 are capable of storing at least n values.

Example

Sixteen stage circular dispatch queue. How many bits are required in the pointer register?

Solution n=16. Pointer should be a register or latch with at least 4 bits in order to indicate 16 different binary values by the equation $2^4 >= 16$.

The TD pointer 78 is coupled to storage sequence logic 100. The storage sequence logic 100 is coupled to the select line inputs 102 of the n stages of instruction multiplexors 86 so that a new instruction, fetched by the instruction sequential fetcher 14, will be stored in a top stage of the n stages of instruction registers 88 indicated by the value in the TD pointer 78. The storage sequence logic 100 may be implemented with a four to sixteen decoder used to single out a single stage, or multiple stages, within the n stages of instruction registers 88, depending on the instruction fetch capability of the microprocessor 10. The remaining stages of the n stages of instruction registers 88, not specified by the value in the TD pointer 78, will retain their respective stored instruction. This function is conventionally performed internal to the register stages 88.

Fetch control logic 104 is used to increment the value in the TD pointer 78, after an instruction or instructions is stored, by the number of instructions just stored. When the value is equal to n−1, incrementing begins with the value 0. For a circular dispatch queue 74 having 16 stages of instruction registers 88 and 4 bit pointer registers 76, this portion of the fetch control logic may be implemented in numerous ways, including with a 4 bit adder accepting input from the TD pointer 78 and a number corresponding to the number of instructions just stored, and returning output to the TD pointer 78.

The fetch control logic 104 also sends flag signals to the instruction sequential fetcher over line 106. A flag signal will be sent when the value in the TD pointer 78 equals the value in the BD pointer 80, thus indicating that the circular dispatch queue 74 is empty. Flag signals are also sent when the value in the BD pointer 80, subtracted from the value in the TD pointer 78, is equal to n, thus indicating that the circular dispatch queue 74 is full.

These portions of the fetch control logic 104 could be implemented with conventional means, including with 4 bit subtract logic accepting inputs from both the BD pointer 80 and the TD pointer 78. The outputs from the subtract logic could then be compared with the values 0 and n to generate flag signal output corresponding to the empty and full state respectively.

Dispatch sequence logic 108 is coupled to the BD pointer 80 and is used to control the select lines 110 of a plurality of m dispatch multiplexors 90. Each of the m dispatch multiplexors 90 is coupled at its inputs to the outputs of all n stages of instruction registers 88. The BD pointer 80 supplies a value to the dispatch sequence logic 108, indicating the bottom of the circular dispatch queue 74. Then the dispatch sequence logic 108 causes the m dispatch multiplexors 90 to select and output the next m instructions from the bottom stages of the circular dispatch queue 74, to the dispatch router 20.

Dispatch control logic 112 is coupled at its inputs to both the BD 80 and TD 78 pointer, and at its outputs to the BD pointer 80 and the dispatch router 20. The dispatch control logic 112 subtracts the value in the BD pointer 80 from the value in the TD pointer 78 in order to determine the number of instructions present in the circular dispatch queue 74. This number represents the maximum number of instructions that can be dispatched from the dispatch queue 74, and is output to the dispatch router 20.

The dispatch router 20 is coupled at its inputs to both the dispatch control logic 112 and the m dispatch multiplexors 90, and at its outputs to instruction dispatch busses 42 feeding the execution units in the microprocessor. The dispatch router 20 dispatches instructions, present at the outputs of the m dispatch multiplexors 90, to the execution units 28 as available, up to the maximum dispatch capability of the microprocessor 10. The number of instructions dispatched is also limited by the number of instructions in the circular dispatch queue 74 as indicated by the dispatch control logic 112.

After instructions are dispatched from the dispatch router 20, the dispatch control logic 112 increments the value in the BD pointer 80 by a value corresponding to the number of instructions just dispatched. This function can be implemented with a 4 bit adder accepting inputs from the BD pointer 80 and a value representing the number of instructions just dispatched, with the output being stored back into the BD pointer 80.

Although specific embodiments of the invention have been disclosed, it will be understood by those having ordinary skill in the art that changes can be made to the specific embodiments without departing from the spirit and the scope of the invention.

What is claimed is:

1. A system for buffering instructions for later execution comprising:

an instruction source;

an execution unit for executing instructions; and a circular dispatch queue, coupled between said instruction source and said execution unit, for buffering instructions between said instruction source and said execution unit, wherein said circular dispatch queue comprises:

a bottom of dispatch queue pointer (BD pointer); dispatch multiplexors; and dispatch sequence logic, coupled to said BD pointer controlling said dispatch multiplexors so that said circular dispatch queue will output said instructions from the bottom of said circular dispatch queue to said execution unit.

2. The system of claim 1, implemented in a Reduced Instruction Set Computer (RISC) microprocessor.

3. The system of claim 2, wherein said instruction source comprises:

a cache memory, residing on said RISC microprocessor, for storing instructions;

a bus interface unit, coupled to said cache memory, for receiving instructions from external to said RISC microprocessor;

an external bus, coupled to said bus interface unit, for carrying instructions; and external memory means, coupled to said external bus, for storing instructions and sending instructions over said external bus to said bus interface unit.

4. The system of claim 3, further comprising:

a sequential fetcher, coupled between said circular dispatch queue and said instruction source, for retrieving a new instruction.

5. The system of claim 4, further comprising:

a dispatch router, coupled between said circular dispatch queue and said execution unit, for routing an instruction from said circular dispatch queue to said execution unit.

6. A system for buffering instructions for later execution comprising:

an instruction source;

an execution unit for executing instructions; and a circular dispatch queue, coupled between said instruction source and said execution unit, for buffering instructions between said instruction source and said execution unit, wherein said circular dispatch queue comprises:

n instruction multiplexors, each having inputs coupled to a sequential fetcher, for selecting and supplying a new instruction to its outputs;

n stages of instruction registers, each stage having inputs coupled to a corresponding output from one of said n instruction multiplexors, for storing instructions;

a bottom of dispatch queue pointer (BD pointer) and a top of dispatch queue pointer (TD pointer), each capable of storing n different values, a value in said TD pointer indicating a top stage of said n stages of instruction registers, and a value in said BD pointer indicating a bottom stage of said n stages of instruction registers;

storage sequence logic, coupled to said TD pointer, controlling said n instruction multiplexors, so that said new instruction will be stored in said top stage of said n stages of instruction registers, and said storage sequence logic causing a remaining n−1 stages of said n stages of instruction registers to retain stored instructions;

fetch control logic coupled to said BD pointer and said TD pointer for changing the value in said TD pointer, in response to said new instruction being stored in said top stage of said n stages of instruction registers, until said value in said TD pointer is equal to a first predetermined value, after which said value in said TD pointer is reset to a second predetermined value, and said fetch control logic sending flag signals to said sequential fetcher indicating the status of said circular dispatch queue;

m dispatch multiplexors, each having inputs coupled to outputs from all of said n stages of instruction registers, m being less than n;

dispatch sequence logic, coupled to said BD pointer, controlling said m dispatch multiplexors, so that said m dispatch multiplexors will output m instructions beginning from said bottom stage of said n stages of instruction registers; and dispatch control logic, coupled to the outputs of said BD pointer and said TD pointer, for determining a maximum number of instructions available for simultaneous dispatch from the outputs of said m dispatch multiplexors, said maximum number of instructions being less than m+1 and based on said values in said BD pointer and said TD pointer, and said dispatch control logic subsequently changing said value in said BD pointer based on an actual number of instructions previously dispatched, until said value in said BD pointer is equal to said first predetermined value, after which said value in said BD pointer is reset to said second predetermined value.

7. The system of claim 6, wherein said flag signals in said circular dispatch queue indicate when said circular dispatch queue is empty and full.

8. The system of claim 7, wherein:

said first predetermined value is equal to n−1 and said second predetermined value is equal to 0;

said fetch control logic increments said value in said TD pointer in response to said new instruction being stored in said top stage, until said value in said TD pointer is equal to n−1, after which incrementing begins with the value 0; and said flag signals indicate being empty when said value in said TD pointer equals the value in said BD pointer, and said flag signals indicate being full when said value in said BD pointer subtracted from said value in said TD pointer is equal to n.

9. The system of claim 4, wherein said sequential fetcher is capable of simultaneously fetching a plurality of instructions and simultaneously storing said plurality of instructions in said circular dispatch queue.

10. The system of claim 4, wherein said sequential fetcher is coupled to a branch prediction unit for pre-decoding said plurality of instructions, predicting branch instructions in the instruction sequence, and inserting out of order instructions into the instruction sequence.

11. The system of claim 5, wherein said dispatch router sends a plurality of instructions to diverse execution units, including a fixed point unit, a floating point unit, and a load store unit for simultaneous execution.

12. A method of buffering instructions for later execution comprising the steps of:

a) fetching a new instruction;

b) storing said instruction in a circular dispatch queue; and c) dispatching stored instructions from the bottom of said circular dispatch queue, via dispatch multiplexors, based on storage sequence logic coupled to a bottom of dispatch queue pointer.

13. The method of claim 12, implemented in a Reduced Instruction Set Computer (RISC) microprocessor.

14. A method for retrieving and temporarily storing a sequence of up to n instructions for later execution comprising the steps of:

retrieving a new instruction;

maintaining a bottom of dispatch queue pointer (BD pointer) and a top of dispatch queue pointer (TD pointer), each capable of storing n different values, a value in said TD pointer indicating a top stage of n stages of instruction registers, and a value in said BD pointer indicating a bottom stage of said n stages of instruction registers;

selecting and supplying said new instruction to said top stage of said n stages of instruction registers;

causing a remaining n−1 stages of said n stages of instruction registers to retain stored instructions;

changing the value in said TD pointer, in response to said new instruction being stored in said top stage of said n stages of instruction registers, until said value in said TD pointer is equal to a first predetermined value, after which said value in said TD pointer is reset to a second predetermined value;

sending flag signals indicating the status of the circular dispatch queue;

sending m instructions beginning from said bottom stage of said n stages of instruction registers to a dispatch router;

determining a maximum number of instructions available for simultaneous dispatch from the dispatch router, said maximum number of instructions based on said values in said BD pointer and said TD pointer, and subsequently changing the value in said BD pointer based on an actual number of instructions previously dispatched, until said value in said BD pointer would pass said first predetermined value, after which said value in said BD pointer is reset to said second predetermined value; and dispatching said actual number of instructions from the dispatch router.

15. The method of claim 14, wherein said flag signals indicate when the circular dispatch queue is empty and full.

16. The method of claim 15, wherein:

said first predetermined value is equal to n−1 and said second predetermined value is equal to 0;

said value in said TD pointer is incremented in response to said new instruction being stored in said top stage, until said value in said TD pointer is equal to n−1, after which incrementing begins with the value 0; and said flag signals indicate being empty when said value in said TD pointer equals the value in said BD pointer, and said flag signals indicate being full when said value in said BD pointer subtracted from said value in said TD pointer is equal to n.

17. The method of claim 12, implemented on a Reduced Instruction Set Computer (RISC) microprocessor.

18. The method of claim 12, further comprising the step of:

predicting branch instructions in the instruction sequence, and inserting out of order instructions into the instruction sequence.

* * * * *